Figure 1:
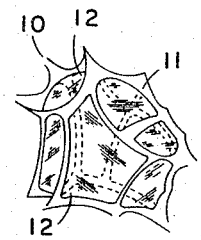
Figure 2:
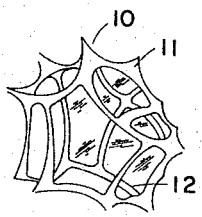

April 18, 1967  S. G. BELAK ET AL  3,314,903
OIL EXTENDED POLYURETHANE FOAM AND
PROCESS FOR PREPARING SAME
Filed June 2, 1966

INVENTORS
STEVEN G. BELAK
WILLIAM J. STOUT
BY
Donald R. Johnson
ATTORNEY 3,314,903
OIL EXTENDED POLYURETHANE FOAM AND PROCESS FOR PREPARING SAME
Steven G. Belak, Claymont, and William J. Stout, Wilmington, Del., assignors to Sun Oil Company, Philadelphia, Pa., a corporation of New Jersey
Filed June 2, 1966, Ser. No. 554,742
14 Claims. (Cl. 260—2.5)

This application is a continuation-in-part of application Ser. No. 493,268 filed Oct. 5, 1965, now abandoned, which is a continuation-in-part of application Ser. No. 127,884 filed July 31, 1961, and now abandoned.

This invention relates to an extended rigid polyurethane foam. More particularly, the invention relates to rigid polyurethane foams extended with oils.

Extended foams differ from impregnated foams in that impregnants are added after the foam is formed. Extenders are added before the foam is formed. It has been proposed in the prior art to impregnate foams with various materials. In many instances and particularly in the case of rigid foams, the impregnating material does not penetrate deeply into the foam. We have found that a very complete and thorough dispersion is obtained when the material is added prior to the foaming step. In addition, we have found that moderate amounts of oil can be added to the foam ingredients without deflating the foam while maintaining the cell walls or membrane structure between cells. This is directly contrary to some prior art statements that oils must be kept out of contact with the foam ingredients since they have a detrimental effect on the foaming operation and the resulting foam. Recent art, however, teaches that 5–40 weight percent of petroleum containing mixtures may be added to polyurethane foams prior to foaming to produce flexible foams having substantially completely skeletal or reticulated cell structure. The foams of our invention have excellent resistance to moisture and good color stability in addition to the usual properties of urethane foams. In the foams of the present invention it appears that the oil is partially chemically combined with the foam, but we do not wish to be bound by this theory.

It is the object of this invention to provide a versatile low-cost rigid polyurethane foam having substantially all of the cell walls intact containing a moderate amount of oil. Another object of the invention is to provide a process in which the oil is added to the foam ingredients prior to foaming.

In the drawings:
FIGURE I is a front view of an individual polyurethane cell in a cellular polyurethane material illustrating the cell structure and cell membranes.
FIGURE II is a front view of an individual polyurethane cell with a portion of the cell walls removed.

Petroleum refining operations are the source of a host of specialty oils which have found utility in various industrial processing operations.

We have found that a number of different oils may be used to extend rigid polyurethane foams. The oils may be light or heavy, but the lighter oils are more suitable. A particularly suitable group of oils are those having molecular weights ranging from 100–700, preferably 200–500, a refractive index ranging from 1.45 to 1.60, and a VGC (viscosity-gravity constant) ranging from .79 to 1.05. Viscosity-gravity constant is a function of the composition of the oil. It increases as the number of aromatic or naphthene rings increase and can thus be used as a measure of the aromaticity of the oil. The formula for computing VGC is $$\frac{G - 0.24 - 0.022 \text{ LOG } (V_1 - 35.5)}{0.755}$$

where $G$=specific gravity at 60° F. and $V_1$=Saybolt Universal viscosity at 210° F. (see Mill et al. Industrial and Engineering Chemistry, volume 20, 641 (1928). The oils may be naphthenic, paraffinic, or aromatic in character. By the term "naphthenic" we mean oils containing substantial amounts of carbon atoms in naphthenic rings—$C_n$ (this method of classifying oil is described in Analytical Chemistry, volume 30, 1224 (1958), and Industrial and Engineering Chemistry, volume 48, 2232 (1956)), i.e., 30 to 45 percent and a viscosity-gravity constant ranging from .85 to .90. By the term "paraffinic" we mean oils containing substantial amounts of carbon atoms in paraffin chains—$C_p$, i.e., 50 to 70 percent and a viscosity-gravity constant ranging from .79 to .84. By the term "aromatic" we mean oils containing substantial amounts of carbon atoms in aromatic rings—$C_a$, i.e., 30 to 60 percent and a viscosity-gravity constant ranging from .91 to 1.05. Generally, the oils will have a viscosity ranging from 30 to 100 Saybolt Universal seconds at 210° F. Mixtures of the above oils may be used.

We have found that up to 17 weight percent of the described oils may be added to components prior to foaming without destroying the wall or membrane structure of the rigid foams. Thus, the foams of the invention have substantially all of their cell walls intact. Amounts of oil above 17 weight percent result in approximately 5 to 100 percent of the cell walls being removed depending on the amount of oil used. Furthermore, at over 17 weight percent of oil the oil is not all incorporated into the foam, thus imparting an oily feel to the foams. At oil concentrations of 19 weight percent and above free oil begins to occur in the cell structure. For example, at 20 weight percent oil about 5 percent of the cell walls are removed, the foam is oily to the touch and a small amount of oil may be forced from the foam by pressure on the surface. When oil is added to the polyurethane foam ingredients as specified herein for the production of rigid polyurethane foams, the foams contain from 96 to 100 percent of the cell walls intact.

This may be more clearly understood by reference to the drawings. FIGURE I represents a single polyurethane cell with all of the cell walls or membranes intact and is representative of the type of foam produced according to the invention. FIGURE II is representative of a foam which has a substantial number of the cell walls removed and is variously described as "open cell," "skeletal" and "reticulated."

FIGURE I represents an individual cell 10 produced according to Examples 1–8, 10, 11 and 12. It comprises a "skeletal" structure 11 and cell walls or membranes 12. FIGURE II represents an individual cell 10 produced according to Examples 9, 13 and 14 wherein a number of the cell walls 12 have been removed.

It is entirely unexpected from the prior art that the membrane structure of the foam may be preserved when operating to produce foams according to the present invention.

As little oil as desired may be employed in the foams according to the present invention since the membrane structure is present in rigid foams containing 0–17 weight percent oil. It is preferred that the amount of oil employed be in the range of 1 to 17 weight percent and more preferably in the range of 5 to 17 weight percent.

The benefit to be derived from the oil extended foams of the present invention as opposed to those of the prior art is the membrance structure which allows the present foams to be used as insulating material having a lower cost than the unextended foams. The skeletal or reticulated foams of the prior art are not useful in this manner because the insulating effect of the trapped gases is lost.

A variety of organic polyisocyanates can be employed in producing the foams of the invention, although aromatic di-isocyanates are generally used. Di-isocyanates include 4- and 2,6-toluene di-isocyanates and mixtures thereof; 4- and 1,5-naphthalene di-isocyanate; phenyl di-isocyanates such as 4,4'-di-phenylmethane, p-dixylylmethane-4'-di-isocyanate; and tri-isocyanates such as diphenyl-6,4'-tri-isocyanate. Side chain di-isocyanates like naphylylene and xylylene di-isocyanates can be used.

Polyols having a molecular weight ranging from about 10 to about 10,000 are used as sources of active hydrogen. These include polyesters and polyethers. The polyesters are derived from polyfunctional acids and polyols such as the adipates, succinates, sebacates, azelates and phthalates of pentaerythritol, xylitol and sorbitol. Suitable polyethers include the condensation products of propylene oxide with polyfunctional alcohols and amines such as glycerol, pentaerythritol, xylitol, sorbitol, α-methyl ucoside, and ethylenediamine.

In order to produce oil-extended, rigid foams having 5–100 percent of the cell walls intact according to the present invention, it has been found that there must be sufficient degree of cross linking in the foams to provide cell walls of sufficient strength particularly in the presence of the oil extender which cell walls will retain the foaming gas without rupture. To achieve the degree of cross linking necessary, it has been found that the polyols employed according to the invention must have a hydroxyl number of at least 250 and more preferably 350.

It is the usual practice to use a catalyst. Compounds such as bismuth nitrate, lead 2-ethylhexoate, lead benzoate, lead oleate, sodium trichlorophenate, tetrabutyl titanate, ferric chloride, stannous octoate, stannous oleate, butyltin trichloride, and tertiary amines such as triethylene diamine, are suitable catalysts.

The foam may be prepared by batch, semi-continuous or continuous methods using bench equipment, or commercial foam machines. The usual procedure is to blend the oil and the polyhydroxy compound with heating and stirring to obtain a thorough dispersion of the oil. In one embodiment the catalyst, emulsifier, and the blowing agent are mixed in a separate container and then blended with the mixed oil and polyol. The di-isocyanate is added, and foaming begins immediately. In another embodiment, part of the polyol is mixed with the di-isocyanate to form a prepolymer which is blended with the oil. The remainder of the polyol and the other components and a liquefied halohydrocarbon gas are added, and the temperature is raised above the boiling point of the gas. In a further embodiment, water is used instead of a halohydrocarbon gas. The water reacts with excess isocyanate producing $CO_2$.

Suitable halohydrocarbons for use as blowing agents include $CCl_3F$, $CCl_2F-CCl_2F$, and $C_2Cl_3F_3$. Nitrogen-type blowing agents can also be used.

The invention is applicable to the production of foams by foaming in place and by passing the ingredients through a mixing head on to a surface. The technique of frothing may be used. The latter is a method of partially pre-expanding the foams in which additional blowing agent is added under pressure to the liquid ingredients just prior to dispensing the foam.

Pressure ranging from 0.1 to 10 atmospheres, and temperatures ranging from 40 to 200° F. may be used in the foaming step.

The following table shows the properties and composition of the oils used in our examples.

TABLE I

| Oil | A | B | C |
|---|---|---|---|
| Viscosity Saybolt Universal Seconds/100° F | 213 | 781 | 3,300 |
| Viscosity Saybolt Universal Seconds/210° F | 47 | 60 | 90 |
| API Gravity | 30.7 | 21 | 12.5 |
| Specific Gravity | .08724 | .9280 | .979 |
| Molecular Weight | 414 | 380 | 370 |
| Viscosity-Gravity Constant | .817 | .870 | .929 |
| Refractive Index at 60° F | 1.4784 | 1.5085 | [2] 1.5487 |
| Gel Aromatics, Weight Percent | 10.7 | 39.6 | 77 |
| Hydrocarbon Composition Carbon-type Analysis:[1] | | | |
| $C_a$, Percent | 3 | 14 | 34 |
| $C_n$, Percent | 33 | 41 | 32 |
| $C_p$, Percent | 64 | 45 | 34 |

[1] $C_a$—Carbons in aromatic rings.
$C_n$—Carbons in naphthene.
$C_p$—Carbons in paraffin chains.
[2] At 68° F.

See Analytical Chemistry, Volume 30, 1224 (1948) and Industrial and Engineering Chemistry, Volume 48, 2232 (1956).

EXAMPLES 1–11

The examples are presented below in tabular form. In formulating the first component, the oil is mixed with a prepolymer of polyether and toluene di-isocyanate. The polyether is a condensation product of sorbitol with propylene oxide having the following properties: hydroxyl number 490, approximate viscosity 10,000 (Hoeppler), theoretical molecular weight 760, and acid number 0.30.

TABLE II

| Example No. | First Component | | Second Component | | | | | Remarks—Foam Appearance [2] |
|---|---|---|---|---|---|---|---|---|
| | Oil | | Prepolymer, Parts [1] | Surfactant [1] | Catalyst [1] | Polyol, Parts [1] | $CCl_3F$, Parts [1] | |
| | Type | Parts [1] (Weight Percent) | | | | | | |
| | | 0 (0) | 100 | .5 | .4 | 66 | 33.1 | White foam, very small closed cell structure (about 48 cells per linear inch). |
| | A | 4 (2) | 96 | .5 | .4 | 66 | 33.1 | White foam, medium closed cell structure (about 10 cells per linear inch). |
| | A | 10 (5) | 90 | .5 | .4 | 66 | 33.1 | Eggshell colored foam, medium closed cell structure (about 8 cells per linear inch). |
| | A | 20 (10) | 80 | .5 | .4 | 66 | 33.1 | Eggshell colored foam, large closed cell structure (about 6 cells per linear inch). |
| | A | 30 (15) | 70 | .5 | .4 | 66 | 33.1 | Do. |
| | A | 34 (17) | 66 | .5 | .4 | 66 | 33.1 | Eggshell colored foam, medium closed cell structure (about 10 cells per linear inch). |
| | A | 36 (18) | 64 | .5 | .4 | 66 | 33.1 | Eggshell colored foam, medium closed cell structure (about 10 cells per linear inch) (slight bleed out of oil). |
| | A | 38 (19) | 62 | .5 | .4 | 66 | 33.1 | Eggshell colored foam, medium closed cell structure (about 10 cells per linear inch) (excessive bleed out of oil). |
| | A | 40 (20) | 60 | .5 | .4 | 66 | 33.1 | Eggshell colored foam, medium partially open cell structure (about 10 cells per linear inch); foam is oily to the touch and contains some free oil in the cells (excessive bleed out of oil). |
| | B | 20 (10) | 80 | .5 | .4 | 66 | 33.1 | Eggshell colored foam, medium closed cell structure (about 8 cells per linear inch). |
| | C | 20 (10) | 80 | .5 | .4 | 66 | 33.1 | Dark honey-colored foam, medium closed cell structure (about 8 cells per linear inch). |

[1] Parts by weight.
[2] The term "closed" cell is used in describing the foam appearance. It is understood to mean that 96–100% of the cell walls were intact.

The prepolymer is a mixture of 114.5 parts of polyether with 391.5 parts of 80–20 TDI (80% 2,4-isomer and 20% 2,6-isomer toluene di-isocyanate). The second component is made by mixing the surfactant, a polysiloxane-polyoxyalkylene block copolymer, having a specific gravity (20° C./25° C.) of 1.03 and a hydroxyl number of 20, the catalyst—triethylene diamine, the blowing agent—trichloromonofluoromethane, and the remainder of the polyol. Oil was substituted for a portion of the first component in the various runs. The runs were made at ambient temperature and pressure. The first and second components are mixed for a short period (5–20 seconds). Foaming begins immediately and proceeds without further treatment. The complete foam is cured at ambient temperature for about 30 minutes and removed from the mold. The heat of reaction raised the temperature in the center of the mold to a range of 180–250° F.

The above examples show that various types of oils can be incorporated in rigid urethane foams during the foaming step, and the critical upper limit of oil that may be added to said foams to maintain the cell wall structure and the incorporation of oil in the foam. Cell structure in the foams of Examples 2–6 may be described generally as either medium or large, however, these foams were also observed to have a somewhat irregular cell size as compared to unextended or 2% oil foams. No open cell structure was observed in the foams of Examples 2–6.

The foams of Examples 10 and 11 have on their upper surface a number of open cell faces, however, examination of the internal structure of the foam shows these foams to have substantially all of the cell walls intact.

EXAMPLE 12

In this example the "one shot" technique was employed. Twenty grams (10 weight percent) of oil A was added to 84 grams of a polyether which is a condensation product of sorbitol with propylene oxide having a hydroxyl number of 490, approximate viscosity of 10,000, molecular weight of 760, and acid number of 0.30; 73 grams of impure TDI (85% TDI—80:20 mixture); .5 gram of a surfactant, a polysiloxane-polyoxyalkylene block copolymer having a specific gravity (20° C./25° C.) of 1.03 and a hydroxyl number of 20; .4 gram of triethylene diamine catalyst; and 33 grams of trichloromonofluoromethane blowing agent. The TDI and blowing agent are added last and the components are mixed for a short period of time (5–20 seconds) and the mixture poured into a paper-lined mold. Foaming begins immediately and proceeds rapidly without further treatment. After allowing the foam to cure at ambient temperature for 30 minutes, it is removed from the mold. The foam is rigid and has substantially all of the cell walls intact when examined visually. The foam color is light brown and has large cell structure. The foam is not oily, all of the oil apparently being incorporated into the foam structure.

EXAMPLE 13

A first component is prepared containing 150 grams of a prepolymer produced from castor oil and toluene di-isocyanate having 9.1 weight percent excess isocyanate content and equivalent weight per isocyanate group of 461 mixed with 25 grams (10 weight percent total foam) of oil A. A second component is prepared containing 70 grams of a polyether which is the condensation product of glycerol with propylene oxide and ethylene oxide (the polyoxypropylene adduct of glycerine tipped with ethylene oxide) having a molecular weight of 3,000, a hydroxyl number of 54.4 and primary hydroxyls; 0.3 gram triethylene diamine; 0.7 gram stannous octoate; 1.0 gram of a surfactant, a polysiloxane-polyoxyalkylene block copolymer having a specific gravity (20° C./25° C.) of 1.03 and a hydroxyl number of 20; and 2.2 grams of water. The first and second components were mixed for a short period (10–30 seconds). Foaming began immediately. After the foaming was completed, the foam was cured for one hour at 150° F. The foam was flexible. It was bright red colored and contained a large number of ruptured cell walls with a slight amount of skeletal structure. There were about 16 cells per linear inch.

EXAMPLE 14

This example shows a "one shot" flexible foam. The following ingredients are mixed: 100 grams of a polyether which is the condensation product of glycerol with propylene oxide and ethylene oxide (the polyoxypropylene adduct of glycerine tipped with ethylene oxide) having a molecular weight of 3,000, a hydroxyl number of 54.4 and primary hydroxyls; 0.2 gram of triethylene diamine; 1.0 gram of a surfactant, a polysiloxane-polyoxyalkylene block copolymer having a specific gravity (20° C./25° C.) of 1.03 and a hydroxyl number of 20; 0.4 gram of stannous octoate; 3.5 grams of water; and 44 grams of TDI (80/20 mixture) containing 16.6 grams of oil A (10 weight percent). Upon addition of the TDI-oil ingredient foaming began, allowing only a few seconds for stirring. After foaming, the foam was cured for one hour at 150° F. The foam was flexible and had about 10 cells per linear inch. Substantially, all of the cell walls were ruptured to some extent upon visual inspection with a large proportion of the ruptured walls being entirely removed so that the foam was partially skeletal or reticulated.

The molds employed for the previous foaming examples were all lined with paper to prevent adherence of the foams to the molds. In the examples employing more than 17 weight percent oil, the paper liners were oil-stained—from a few oil spots with 18% oil to total oil saturation of the liner with 20% oil foam.

The invention claimed is:

1. A process for the production of an oil-extended rigid polyurethane foam having 96 to 100% of the cell walls intact comprising blending (1) from 5 to 17 weight percent of an oil derived from petroleum refining operations having a viscosity in the range of 30–100 Saybolt Universal seconds at 210° F., a viscosity-gravity constant in the range of 0.79 to 1.05, and a molecular weight in the range of 200–500; (2) a liquid polyol having a molecular weight in the range from about 500 to about 10,000 and a hydroxyl number of at least 250; (3) an aromatic di-isocyanate; (4) an emulsifier; (5) a catalyst and (6) a blowing agent; and foaming the mixture.

2. A process according to claim 1 comprising forming a first component by blending the oil with a preformed reaction product of the liquid polyol and the aromatic di-isocyanate, forming a second component containing the emulsifier, the catalyst, additional polyol and the blowing agent, and mixing the first and second components.

3. A process according to claim 1 wherein the blowing agent is a liquefied halohydrocarbon.

4. A process according to claim 1 wherein the blowing agent is water.

5. A process according to claim 1 wherein the aromatic di-isocyanate is toluene di-isocyanate.

6. A process according to claim 5 wherein the polyol is a condensation product of sorbitol with propylene oxide.

7. A process according to claim 2 wherein the blowing agent is a liquefied halohydrocarbon.

8. A process according to claim 2 wherein the blowing agent is water.

9. A process according to claim 2 wherein the aromatic di-isocyanate is toluene di-isocyanate.

10. A process according to claim 9 wherein the polyol is a condensation product of sorbitol with propylene oxide.

11. A rigid polyurethane foam composition having 96–100% of the cell walls intact extended with from 5 to 17 weight percent of an oil derived from petroleum refining operations having a viscosity in the range of 30–100 Saybolt Universal seconds at 210° F., a viscosity-gravity onstant in the range of .79 to 1.05 and molecular weight in the range of 200 to 500.

12. The extended foam according to claim 11 in which the said oil contains from 30 to 45 percent carbon atoms in naphthenic rings and has a viscosity-gravity constant in the range of .85 to .90.

13. The extended foam according to claim 11 in which the said oil contains from 50 to 70 percent carbon atoms in paraffin chains and has a viscosity-gravity constant in the range of .79 to .84.

14. The extended foam according to claim 11 in which the said oil contains from 30 to 60 percent carbon atoms in aromatic rings and has a viscosity-gravity constant in the range of .91 to 1.05.

References Cited by the Examiner

UNITED STATES PATENTS

| | | | |
|---|---|---|---|
| 3,165,483 | 1/1965 | Gemeinhardt et al. | 260—2.5 |
| 3,190,842 | 6/1965 | Ringwood et al. | 260—2.5 |

OTHER REFERENCES

Purdy "Petroleum" pp. 75 to 77, copyright 1958 pub. by McGraw-Hill Book Co., New York.

Barringer SPE Journal vol. 15, No. 11, November 1959, pp. 961–965.

LEON J. BERCOVITZ, *Primary Examiner.*

DONALD E. CZAJA, *Assistant Examiner.*